United States Patent
Yoon et al.

(10) Patent No.: US 11,682,213 B2
(45) Date of Patent: Jun. 20, 2023

(54) METHOD AND DEVICE FOR TRAINING IMAGE ANALYSIS NEURAL NETWORK MODEL AND INTELLIGENT IMAGE CAPTURING APPARATUS EMPLOYING THE SAME

(71) Applicant: Electronics and Telecommunications Research Institute, Daejeon (KR)

(72) Inventors: Hyun Jin Yoon, Daejeon (KR); Mi Kyong Han, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 275 days.

(21) Appl. No.: 17/235,537

(22) Filed: Apr. 20, 2021

(65) Prior Publication Data

US 2021/0326654 A1 Oct. 21, 2021

(30) Foreign Application Priority Data

Apr. 21, 2020 (KR) .................. 10-2020-0047932

(51) Int. Cl.
*G06K 9/00* (2022.01)
*G06V 20/52* (2022.01)
(Continued)

(52) U.S. Cl.
CPC .......... *G06V 20/52* (2022.01); *G06F 18/2155* (2023.01); *G06F 18/2415* (2023.01);
(Continued)

(58) Field of Classification Search
CPC ...... G06V 20/52; G06V 10/764; G06V 10/82; G06V 20/70; G06F 18/2155;
(Continued)

(56) References Cited

U.S. PATENT DOCUMENTS

| 10,546,209 B2 | 1/2020 | Lee et al. |
| 2019/0180136 A1* | 6/2019 | Bousmalis ............ G06F 18/241 |

(Continued)

FOREIGN PATENT DOCUMENTS

| KR | 10-1982231 | 5/2019 |
| WO | 2018/020277 | 2/2018 |
| WO | 2019/098418 | 5/2019 |

*Primary Examiner* — Dhaval V Patel
(74) *Attorney, Agent, or Firm* — Kile Park Reed & Houtteman PLLC (57) ABSTRACT

The present disclosure provides a method and a device for training a neural network model for use in analyzing captured images, and an intelligent image capturing apparatus employing the same. The neural network model can be trained by performing the image reconstruction and the image classification using based on image data received from a plurality of image capturing devices installed in the monitoring area, calculating at least one loss function based on data processed by the neural network model or the neural network model training device, and determining parameters minimizing the loss function. In addition, the neural network model can be updated through the re-training taking into account the newly acquired image data. Accordingly, the image analysis neural network model can operate with high precision and accuracy.

20 Claims, 7 Drawing Sheets

(51) Int. Cl.
*G06N 3/08* (2023.01)
*G06F 18/214* (2023.01)
*G06F 18/2415* (2023.01)
*G06F 18/2431* (2023.01)
*G06V 10/764* (2022.01)
*G06V 10/82* (2022.01)
*G06V 20/70* (2022.01)

(52) U.S. Cl.
CPC ........... *G06F 18/2431* (2023.01); *G06N 3/08* (2013.01); *G06V 10/764* (2022.01); *G06V 10/82* (2022.01); *G06V 20/70* (2022.01)

(58) Field of Classification Search
CPC ... G06F 18/2415; G06F 18/2431; G06N 3/08; G06N 3/045; G06N 3/04; G06T 5/001; G06T 2207/20084
See application file for complete search history.

(56) References Cited

U.S. PATENT DOCUMENTS

| | | | |
|---|---|---|---|
| 2019/0392591 A1 | 12/2019 | Lee et al. | |
| 2020/0193629 A1* | 6/2020 | Bade | G06V 20/58 |
| 2021/0271978 A1* | 9/2021 | Le Moing | H04R 3/005 |
| 2021/0374477 A1* | 12/2021 | Kim | G06V 10/776 |
| 2022/0028038 A1* | 1/2022 | Yin | G06N 3/08 |

* cited by examiner

METHOD AND DEVICE FOR TRAINING IMAGE ANALYSIS NEURAL NETWORK MODEL AND INTELLIGENT IMAGE CAPTURING APPARATUS EMPLOYING THE SAME

CROSS-REFERENCE TO RELATED APPLICATION

The present application claims priority to Korean Patent Application No. 10-2020-0047932 filed on Apr. 21, 2020 with the Korean Intellectual Property Office (KIPO), the entire content of which is incorporated herein by reference.

BACKGROUND

1. Technical Field

The present disclosure relates to a method and device for training an image analysis neural network model and, more particularly, to a method and device for continual updating the image analysis neural network model to enable an accurate analysis of real-time captured images. Additionally, the present disclosure relates to an intelligent image acquisition apparatus employing the method and device for training the image analysis neural network model.

2. Related Art

An intelligent closed circuit television (CCTV) system refers to a system having a video analytics capability of identifying and tracking objects in multiple images captured by respective cameras or automatically detecting an abnormal situation such as an intrusion, a fight, and an arson based on the images to provide an alert to a monitoring personnel. The video analytics function which has been performed in a video management system (VMS) server or a cloud server is being expansively applied nowadays to devices located at a system edge such as a CCTV camera, a digital video recorder (DVR), and a network video recorder (NVR) to enable a prompt reaction to an emergency situation or to reduce a fear of a personal information leakage.

Despite the rapid increase in the spread of intelligent CCTV system, performance problems such as frequent erroneous detections and detection failures of the system still remain, and it can be said that the actual utilization of the system is not so high compared to its installation amount. Accordingly, attempts to improve the video analytics performance of the intelligent CCTV system by applying a neural network model to the system are drawing attention.

In order to train an image analysis neural network model enough to perform the video analytics stably and reliably, a large amount of labeled CCTV images is required. Training of a single image analysis neural network model showing a stable and reliable performance in a variety of sites requires labeling each of the CCTV images collected from all the sites to be monitored and using all the data for training the model at once.

However, it is strictly prohibited usually to take out personally identifiable CCTV images of the integrated control center or use the data them for purposes other than prescribed purposes. Also, the data stored in the integrated control center data is maintained only for a certain period and then discarded unless there is a special reason. Therefore, it is difficult to train the image analysis neural network model with vast amounts of data collected from various monitoring area because of the concerns about the personal information protection. Further, it is difficult to realize to collect and label the CCTV images of all monitoring sites in a single place and train the neural network model that can be used in all the monitoring sites by using the labeled data because the labeling may take too much time.

Even if the images are labeled and the image analysis neural network model is trained by use of the labeled images, it is impossible to collect all the image data for various environments that the image analysis neural network model may have to recognize in the field in advance, and thus the performance of the image analysis neural network model may deteriorate over time since its deployment in the field.

SUMMARY

To solve the problems above, provided are a method and a device for training a neural network model for use in analyzing captured images with high precision, high performance and high efficiency.

Provided is an intelligent image capturing apparatus with high precision, high performance and high efficiency.

According to an aspect of an exemplary embodiment, the present disclosure provides a method of training a neural network model for use in an analysis of a captured image. The method of training the neural network includes: providing the neural network model with an unlabeled first image and a labeled second image to obtain a first reconstructed image and a second reconstructed image specific to an image environment; providing the neural network model with the unlabeled first image, the labeled second image, an image label of the labeled second image, and a domain label indicating to which category of a first category and a second category an image belongs to obtain a second prediction label for the labeled second image and a domain prediction label for the domain label; calculating at least one loss function using the unlabeled first image, the labeled second image, the second prediction label for the labeled second image, and the domain prediction label for the domain label; and updating parameters of the neural network model such that the at least one loss function is minimized.

The first image may be a locale monitoring image and the second image may be an open image.

The first image may be received from at least one intelligent image capturing device installed in a monitoring area.

The operation of providing the neural network model with the unlabeled first image and the labeled second image to obtain the first reconstructed image and the second reconstructed image may include: generating a first feature vector sequence and a second feature vector sequence from the first image and the second image, respectively; and generating the first reconstructed image and the second reconstructed image from the first feature vector sequence and the second feature vector sequence, respectively.

The operation of generating the first feature vector sequence and the second feature vector sequence from the first image and the second image may include: generating, by a first encoder, the first feature vector sequence from the first image; generating, by a second encoder, the second feature vector sequence from the second image; and generating, by a shared encoder, into a first shared feature vector sequence and a second shared feature vector sequence from the first image and the second image, respectively.

The operation of generating the first reconstructed image and the second reconstructed image from the first feature vector sequence and the second feature vector sequence may include: obtaining, by a first decoder, the first reconstructed image by decoding a first image feature vector sequence which is a combination of the first feature vector sequence and the first shared feature vector sequence; and obtaining, by a second decoder, the second reconstructed image by decoding a second image feature vector sequence which is a combination of the second feature vector sequence and the second shared feature vector sequence.

The operation of providing the neural network model with the unlabeled first image, the labeled second image, the image label of the labeled second image, and the domain label to obtain the second prediction label for the labeled second image and the domain prediction label for the domain label may include: estimating a reliability of a first classification category to which the first image belongs by using the first image feature vector sequence; estimating a reliability of a second classification category to which the second image data belongs by using the second image feature vector sequence; and obtaining a domain prediction label indicating a prediction of whether an input image belongs to the first classification category or the second classification category by using the first shared feature vector sequence and the second shared feature vector sequence.

The first image feature vector sequence may be generated by combining the first feature vector sequence and the first shared feature vector sequence. The second image feature vector sequence may be generated by combining the second feature vector sequence and the second shared feature vector sequence.

The operation of calculating the at least one loss function may include: calculating a first similarity loss by using a similarity between the first feature vector sequence and the first shared feature vector sequence; calculating a second similarity loss by using a similarity between the second feature vector sequence and the second shared feature vector sequence; calculating a first reconstruction loss by using an error between the first image and the first reconstructed image; calculating a second reconstruction loss by using an error between the second image and the second reconstructed image; calculating a classification loss by using an error between a label of the second image and a second prediction label; calculating a discrimination loss by using an error between the domain label and the domain prediction label; and calculating the loss function by using at least one of the first similarity loss, the second similarity loss, the first reconstruction loss, the second reconstruction loss, the classification loss, and the discrimination loss.

According to another aspect of an exemplary embodiment, the present disclosure provides a device for training a neural network model for use in an analysis of a captured image. The device for training the neural network model include: a processor; and a memory storing at least one instruction to be executed by the processor. The at least one instruction when executed by the processor causes the processor to: provide the neural network model with an unlabeled first image and a labeled second image to obtain a first reconstructed image and a second reconstructed image specific to an image environment; provide the neural network model with the unlabeled first image, the labeled second image, an image label of the labeled second image, and a domain label indicating to which category of a first category and a second category an image belongs to obtain a second prediction label for the labeled second image and a domain prediction label for the domain label; calculate at least one loss function using the unlabeled first image, the labeled second image, the second prediction label for the labeled second image, and the domain prediction label for the domain label; and update parameters of the neural network model such that the at least one loss function is minimized.

The first image may be a locale monitoring image and the second image may be an open image.

The first image may be received from at least one intelligent image capturing device installed in a monitoring area.

The instruction causing the processor to provide the neural network model with the unlabeled first image and the labeled second image to obtain the first reconstructed image and the second reconstructed image may include an instruction causing the processor to: generate a first feature vector sequence and a second feature vector sequence from the first image and the second image, respectively; and generate the first reconstructed image and the second reconstructed image from the first feature vector sequence and the second feature vector sequence, respectively.

The instruction causing the processor to generate the first feature vector sequence and the second feature vector sequence from the first image and the second image may include an instruction causing the processor to: generate, by a first encoder, the first feature vector sequence from the first image; generate, by a second encoder, the second feature vector sequence from the second image; and generate, by a shared encoder, into a first shared feature vector sequence and a second shared feature vector sequence from the first image and the second image, respectively.

The instruction causing the processor to generate the first reconstructed image and the second reconstructed image from the first feature vector sequence and the second feature vector sequence may include an instruction causing the processor to: obtain, by a first decoder, the first reconstructed image by decoding a first image feature vector sequence which is a combination of the first feature vector sequence and the first shared feature vector sequence; and obtain, by a second decoder, the second reconstructed image by decoding a second image feature vector sequence which is a combination of the second feature vector sequence and the second shared feature vector sequence.

The instruction causing the processor to provide the neural network model with the unlabeled first image, the labeled second image, the image label of the labeled second image, and the domain label to obtain the second prediction label for the labeled second image and the domain prediction label for the domain label may include an instruction causing the processor to: estimate a reliability of a first classification category to which the first image belongs by using the first image feature vector sequence; estimate a reliability of a second classification category to which the second image data belongs by using the second image feature vector sequence; and obtain a domain prediction label indicating a prediction of whether an input image belongs to the first classification category or the second classification category by using the first shared feature vector sequence and the second shared feature vector sequence.

The first image feature vector sequence may be generated by combining the first feature vector sequence and the first shared feature vector sequence. The second image feature vector sequence may be generated by combining the second feature vector sequence and the second shared feature vector sequence.

The instruction causing the processor to calculate the at least one loss function may include an instruction causing the processor to: calculate a first similarity loss by using a similarity between the first feature vector sequence and the first shared feature vector sequence; calculate a second similarity loss by using a similarity between the second feature vector sequence and the second shared feature vector sequence; calculate a first reconstruction loss by using an error between the first image and the first reconstructed image; calculate a second reconstruction loss by using an error between the second image and the second reconstructed image; calculate a classification loss by using an error between a label of the second image and a second prediction label; calculate a discrimination loss by using an error between the domain label and the domain prediction label; and calculate the loss function by using at least one of the first similarity loss, the second similarity loss, the first reconstruction loss, the second reconstruction loss, the classification loss, and the discrimination loss.

According to yet another aspect of an exemplary embodiment, the present disclosure provides an intelligent image acquisition apparatus. The intelligent image acquisition apparatus includes: a processor; and a memory storing at least one instruction to be executed by the processor. The at least one instruction when executed by the processor causes the processor to: train the neural network model based on an unlabeled first image and a labeled second image; perform an image analysis on a newly acquired third image by applying the neural network model; and update the neural network model according to an image analysis result. The instruction causing the processor to train the neural network model comprises an instruction causing the processor to: provide the neural network model with the unlabeled first image and the labeled second image to obtain a first reconstructed image and a second reconstructed image specific to an image environment; provide the neural network model with the unlabeled first image, the labeled second image, an image label of the labeled second image, and a domain label indicating to which category of a first category and a second category an image belongs to obtain a second prediction label for the labeled second image and a domain prediction label for the domain label; calculate at least one loss function using the unlabeled first image, the labeled second image, the second prediction label for the labeled second image, and the domain prediction label for the domain label; and update parameters of the neural network model such that the at least one loss function is minimized.

The instruction causing the processor to update the neural network model may include an instruction causing the processor to: calculate a mean squared error between the third image and a reconstruction image of the third image; when the mean squared error is greater than a first threshold, store the third image in a storage device; calculate a cumulative number of occurrences of image reconstruction errors based on a difference between the third image and the reconstruction image of the third image; when at least one of the cumulative number of occurrences of image reconstruction errors and an increasing rate of the mean squared error is greater than a second threshold, update the neural network model.

According to an exemplary embodiment of the present disclosure, the neural network model can be trained by performing the image reconstruction and the image classification using based on image data received from a plurality of image capturing devices installed in the monitoring area, calculating at least one loss function based on data processed by the neural network model or the neural network model training device, and determining parameters minimizing the loss function. In addition, the neural network model can be updated through the re-training taking into account the newly acquired image data. Accordingly, the image analysis neural network model can operate with high precision and accuracy.

BRIEF DESCRIPTION OF THE DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

For a more clear understanding of the features and advantages of the present disclosure, exemplary embodiments of the present disclosure will be described in detail with reference to the accompanied drawings. However, it should be understood that the present disclosure is not limited to particular embodiments disclosed herein but includes all modifications, equivalents, and alternatives falling within the spirit and scope of the present disclosure.

The terminologies including ordinals such as "first" and "second" designated for explaining various components in this specification are used to discriminate a component from the other ones but are not intended to be limiting to a specific component. For example, a second component may be referred to as a first component and, similarly, a first component may also be referred to as a second component without departing from the scope of the present disclosure. As used herein, the term "and/or" may include a presence of one or more of the associated listed items and any and all combinations of the listed items.

When a component is referred to as being "connected" or "coupled" to another component, the component may be directly connected or coupled logically or physically to the other component or indirectly through an object therebetween. Contrarily, when a component is referred to as being "directly connected" or "directly coupled" to another component, it is to be understood that there is no intervening object between the components. Other words used to describe the relationship between elements should be interpreted in a similar fashion.

The terminologies are used herein for the purpose of describing particular exemplary embodiments only and are not intended to limit the present disclosure. The singular forms include plural referents as well unless the context clearly dictates otherwise. Also, the expressions "comprises," "includes," "constructed," "configured" are used to refer a presence of a combination of stated features, numbers, processing steps, operations, elements, or components, but are not intended to preclude a presence or addition of another feature, number, processing step, operation, element, or component.

Unless defined otherwise, all terms used herein, including technical or scientific terms, have the same meaning as commonly understood by those of ordinary skill in the art to which the present disclosure pertains. Terms such as those defined in a commonly used dictionary should be interpreted as having meanings consistent with their meanings in the context of related literatures and will not be interpreted as having ideal or excessively formal meanings unless explicitly defined in the present application.

Exemplary embodiments of the present disclosure will now be described in detail with reference to the accompanying drawings. In the following description and the drawings, similar or corresponding components may be designated by the same or similar reference numerals to facilitate an overall understanding of the present disclosure and replicate description of them will be omitted for simplicity.

Figure 1:
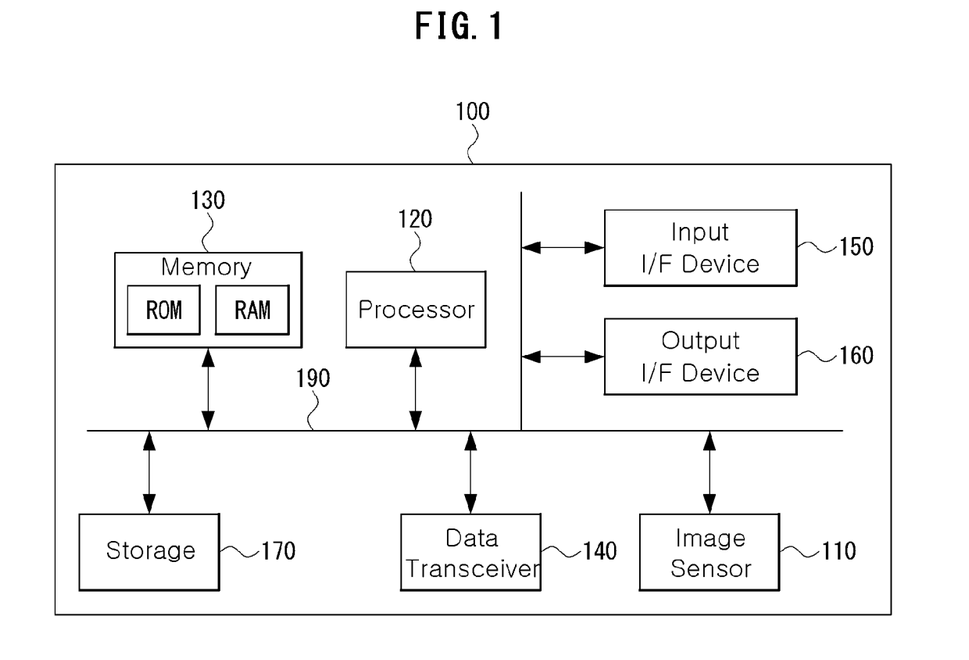
FIG. 1 is a block diagram of an intelligent image acquisition apparatus according to an exemplary embodiment of the present disclosure.

FIG. 1 is a block diagram of an intelligent image acquisition apparatus according to an exemplary embodiment of the present disclosure.

The intelligent image acquisition apparatus 100 shown in FIG. 1 may be an intelligent closed circuit television (CCTV) camera apparatus. However, the present disclosure is not limited thereto, and the intelligent image acquisition apparatus 100 may be another kind of device such as a digital video recorder (DVR) and a network video recorder (NVR) having a video analytics or an image analysis functionality. Further, the intelligent image acquisition apparatus 100 may be a monitoring server in an integrated control center.

In an exemplary embodiment, the intelligent image acquisition apparatus may be installed in a place which requires a capture of its surrounding images to monitor its surroundings and analyze the captured images using an image analysis neural network updated continually. Additionally, the intelligent image acquisition apparatus 100 may perform functions of accumulating the acquired images, transmitting the images to at least one recipient, and storing, recording, and distributing the images to allow a control of the intelligent image acquisition apparatus 100.

The intelligent image acquisition apparatus 100 may include at least one image sensor 110, at least one processor 120, a memory 130 storing at least one instruction to be executed by the processor 120, and a data transceiver 140 performing communications through a network. The intelligent image acquisition apparatus 100 may further include an input interface device 150, an output interface device 160, and a storage 170. The components of the intelligent image acquisition apparatus 100 may be connected by a bus 190 to communicate with each other.

The intelligent image acquisition apparatus 100 can acquire a locale monitoring image for an area to be monitored. The locale monitoring image may include an image acquired by the image sensor 110. Also, the locale monitoring image may include an image received from at least one external intelligent image acquisition apparatus installed in the monitoring area.

The processor 120 may execute program instructions stored in the memory 130 or the storage 170. The processor 120 may include a central processing unit (CPU), a graphics processing unit (GPU), or may be implemented by another kind of dedicated processor suitable for performing the methods of the present disclosure. Each of the program instructions executed by the processor 120 may perform at least one specific functions, which will be described in detail below.

The memory 130 may load the program instructions stored in the storage 170 to provide to the processor 120. The memory 130 may include, for example, a volatile memory such as a read only memory (ROM) and a nonvolatile memory such as a random access memory (RAM). The program instructions loaded to the memory 130 are executed by the processor 120, the program instructions may cause the processor 120 to train a neural network model based on an unlabeled locale monitoring image and a labeled open image, apply a neural network model to perform an image analysis on a newly acquired locale monitoring image, and update the neural network model according to an image analysis result.

Figure 2:
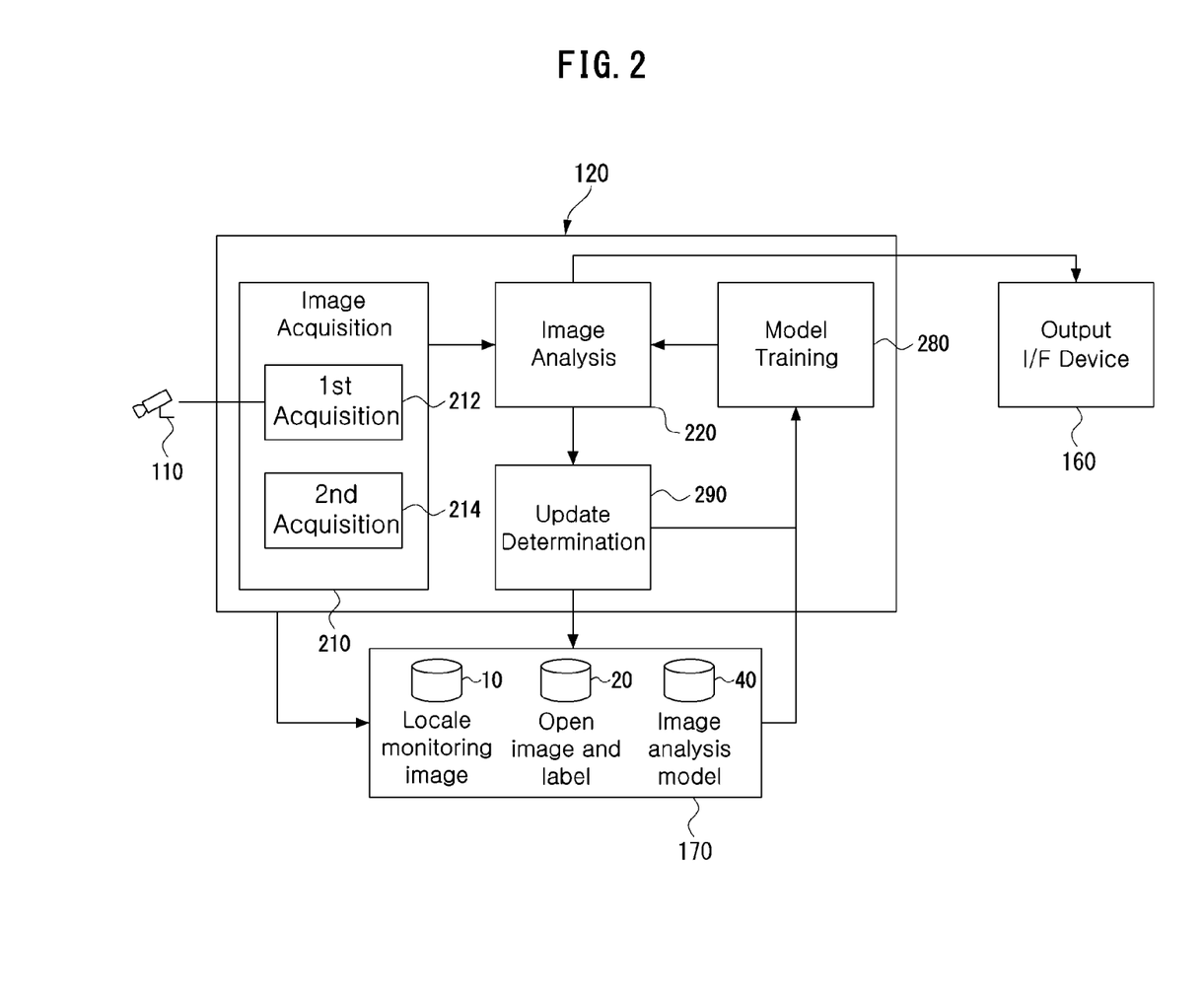
FIG. 2 is a block diagram of a program executable by a processor in the intelligent image acquisition apparatus according to an exemplary embodiment of the present disclosure.

FIG. 2 is a block diagram of a program executable by the processor 120 in the intelligent image acquisition apparatus according to an exemplary embodiment of the present disclosure.

The program executable by the processor 120 may include an image acquisition unit 110, an image analysis unit 220, a model training unit 280, and an update determination unit 290.

The image acquisition unit 110 may acquire at least one image from outside. In an exemplary embodiment of the present disclosure, the image acquisition unit 110 may include a first acquisition unit 212 and a second acquisition unit 214.

The first acquisition unit 212 may acquire locale monitoring image captured by at least one intelligent image capturing device installed in the monitoring area for a learning of an image analysis neural network model, which will be described below in detail. That is, the first acquisition unit 212 may acquire the locale monitoring image from the image sensor 110 shown in FIG. 1. However, the present disclosure is not limited thereto, and the first acquisition unit 212 may acquire at least some of the locale monitoring image from one or more external image capturing devices installed in the monitoring area. Further, the first acquisition unit 212 may acquire a new locale monitoring image to be analyzed by the image analysis unit 220 immediately. In an exemplary embodiment, the locale monitoring image may be unlabeled. In the present specification including the appended claims, the locale monitoring image may be referred to as a first image.

The second acquisition unit 212 may acquire labeled open image from an external server (not shown), for example, for the learning of the image analysis neural network model. In an exemplary embodiment, the open image may be a publicly available image and may be labeled. Thus, the open image acquired by the second acquisition unit 212 may include an image label of the open image. Also, the open image may further include a domain label, which indicates whether an image is one of locale monitoring images or one of open images.

In the present specification including the appended claims, the open image may be referred to as a second image.

The storage 170 may store the unlabeled locale monitoring image 10 and the labeled open image 20 with its label in addition to the program executable by the processor 120 including an image analysis neural network model 40 and image analysis model parameters.

The image analysis unit 220 may be configured based on the image analysis neural network model 40 of which learning or updating has been completed. The image analysis unit 220 may acquire the new locale monitoring image for the monitoring area through the first image acquisition unit 212, and output an analysis result through the output interface unit 160.

The model training unit 280 may train the image analysis neural network model using the data stored in the storage 170 including the unlabeled locale monitoring image 10 and the labeled open image 20 with its label. The model training unit 280 may calculate one or more loss functions based on the unlabeled locale monitoring image 10, the labeled open image 20, and other data generated by the image analysis neural network model to adjust parameters of the image analysis neural network model 40 such that at least one of the loss functions is minimized.

The update determination unit 290 may determine whether an image reconstruction error occurred during the image analysis operation of the image analysis unit 220. When it is determined that an image reconstruction error occurred, the update determination unit 290 may request re-training of the image analysis neural network model 40 from the model training unit 280 and the neural network model 40 may be updated by the model training unit 280.

Figure 3:
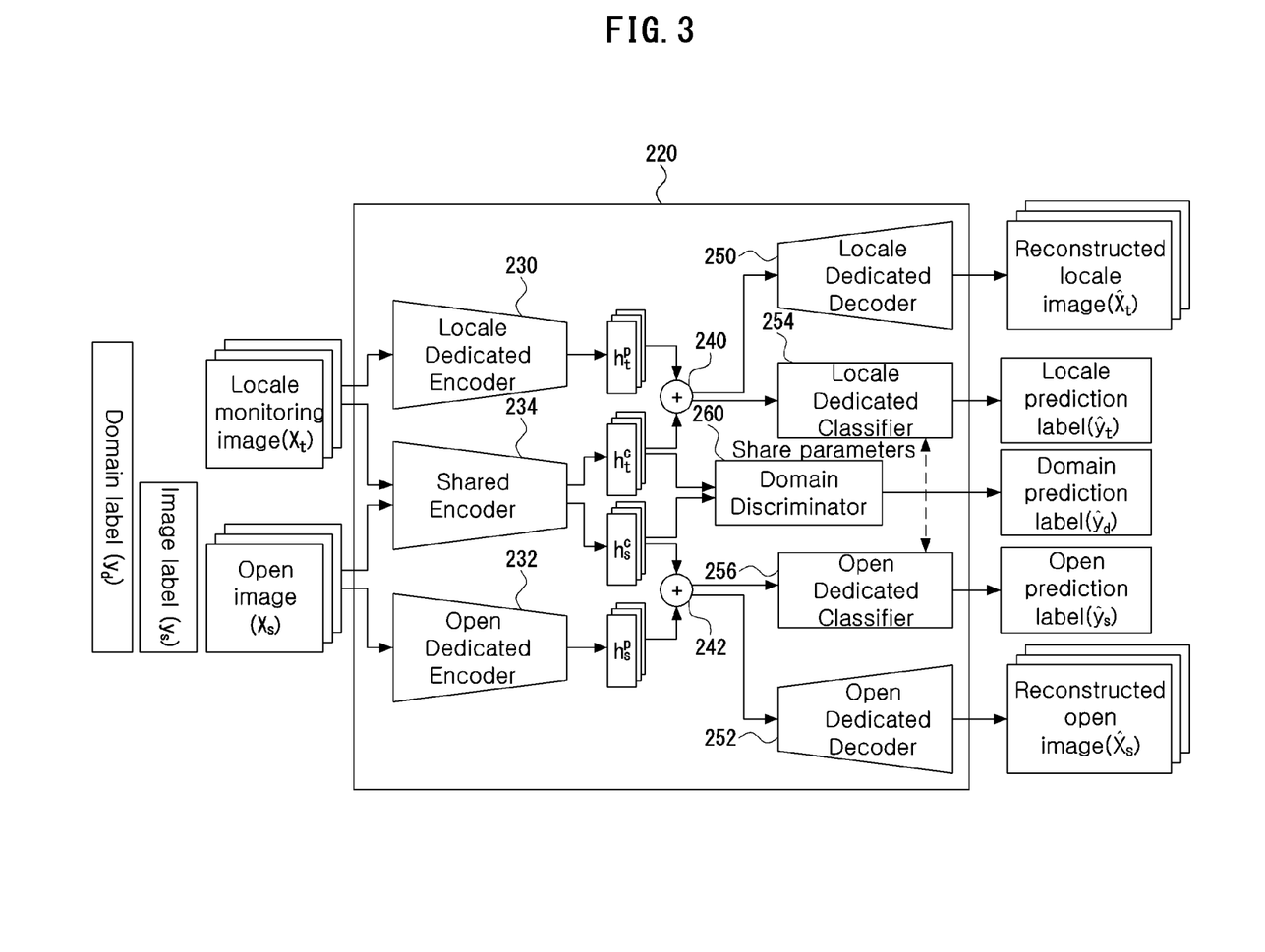
FIG. 3 is a block diagram of an image analysis neural network model in the intelligent image acquisition apparatus according to an exemplary embodiment of the present disclosure.

FIG. 3 is a block diagram of the image analysis neural network model 40 in the intelligent image acquisition apparatus 100 according to an exemplary embodiment of the present disclosure. The image analysis neural network model 40 may include a locale dedicated encoder 230, an open dedicated encoder 232, a shared encoder 234, a locale dedicated decoder 250, and an open dedicated decoder 252. The image analysis neural network model 40 may further include a locale dedicated classifier 254, an open dedicated classifier 256, and a domain discriminator 260.

The image analysis neural network model 40 may receive the unlabeled locale monitoring image $X_t$, the labeled open image $X_s$ and its image label $y_s$, and a domain label $y_d$ indicating whether an image is the locale monitoring image or an open image, and perform an image reconstruction process and an image classification process to analyze the unlabeled locale monitoring image $X_t$. The image analysis neural network model 40 may perform the image reconstruction process and the image classification process sequentially or simultaneously.

During the image reconstruction process, the image analysis neural network model 40 may output a reconstructed locale monitoring image $\hat{X}_t$ having a same size as the locale monitoring image $X_t$ and a reconstructed open image $\hat{X}_s$ having a same size as the open image $X_s$.

During the image classification process, the image analysis neural network model 40 may output a locale prediction label $\hat{y}_t$ representing an estimated reliability score of an image class to which the locale monitoring image $X_t$ belongs, an open prediction label $\hat{y}_t$ representing an estimated reliability score of the image label of the open image $X_s$, and a domain prediction label $\hat{y}_d$ indicating a prediction of whether an input image is a locale monitoring image or an open image.

The image analysis neural network model 40 may be trained by the model training unit 280 such that at least one of the loss functions calculated from the images and labels described above is minimized, for example. After the training is completed, the image analysis neural network model 40 may serve as a basis for the image analysis unit 220. Also, when a reconstruction error happens, the update determination unit 290 may request to update the image analysis neural network model 40 from the model training unit 280, so that the image analysis neural network model 40 may train the image analysis neural network model 40 again. The re-training of the image analysis neural network model 40 may be performed continually.

Referring to FIG. 3, the locale dedicated encoder 230 may receive the locale monitoring image from the first acquisition unit 212 or the storage 170 to generate a first feature vector sequence $h_t^p$ representing features specific to the locale monitoring images. The open dedicated encoder 232 may receive the open image from the first acquisition unit 214 or the storage 170 to generate a second feature vector sequence $h_s^p$ representing features specific to the open images.

The shared encoder 234 may receive the locale monitoring image from the first acquisition unit 212 or the storage 170 to generate a first shared feature vector sequence $h_t^c$. Also, the shared encoder 234 may receive the open image from the second acquisition unit 214 or the storage 170 to generate a second shared feature vector sequence $h_s^c$.

A combiner 240 combines the first feature vector sequence $h_t^p$ output by the locale dedicated encoder 230 and the first shared feature vector sequence $h_t^c$ output by the shared encoder 234 to generate a locale image feature vector sequence. The locale dedicated decoder 250 may receive the locale image feature vector sequence from the combiner 240 and decode the locale image feature vector sequence to output a reconstructed locale image having a same size as the locale monitoring image.

A combiner 242 combines the second feature vector sequence $h_s^p$ output by the open dedicated encoder 232 and the second shared feature vector sequence $h_s^c$ output by the shared encoder 234 to generate an open image feature vector sequence. The open dedicated decoder 252 may receive the open image feature vector sequence from the combiner 242 and decode the open image feature vector sequence to output a reconstructed open image having a same size as the open image.

The local dedicated classifier 254 may receive the locale image feature vector sequence from the combiner 240 to predict a classification category of the locale monitoring image. In other words, the locale dedicated classifier 254 may output a locale prediction label $\hat{y}_t$, by using the locale image feature vector sequence, representing a reliability score of a classification category to which the locale monitoring image may belong.

The open dedicated classifier 256 may receive the open image feature vector sequence from the combiner 242 to predict a classification category of the open image. In other words, the open dedicated classifier 256 may output an open prediction label $\hat{y}_s$, by using the open image feature vector sequence, representing a reliability score of a classification category to which the open image may belong. The neural networks of the local dedicated classifier 254 and the open dedicated classifier 256 have the same structure and may share weighting parameters with each other.

The domain discriminator 260 may receive the first shared feature vector sequence $h_t^c$ and the second shared feature vector sequence $h_s^c$ from the shared encoder 234 and estimates whether the data is associated with the locale monitoring image or the open image. The domain discriminator 260 may output a domain prediction label $\hat{y}_d$ according to a determination result.

Figure 4:
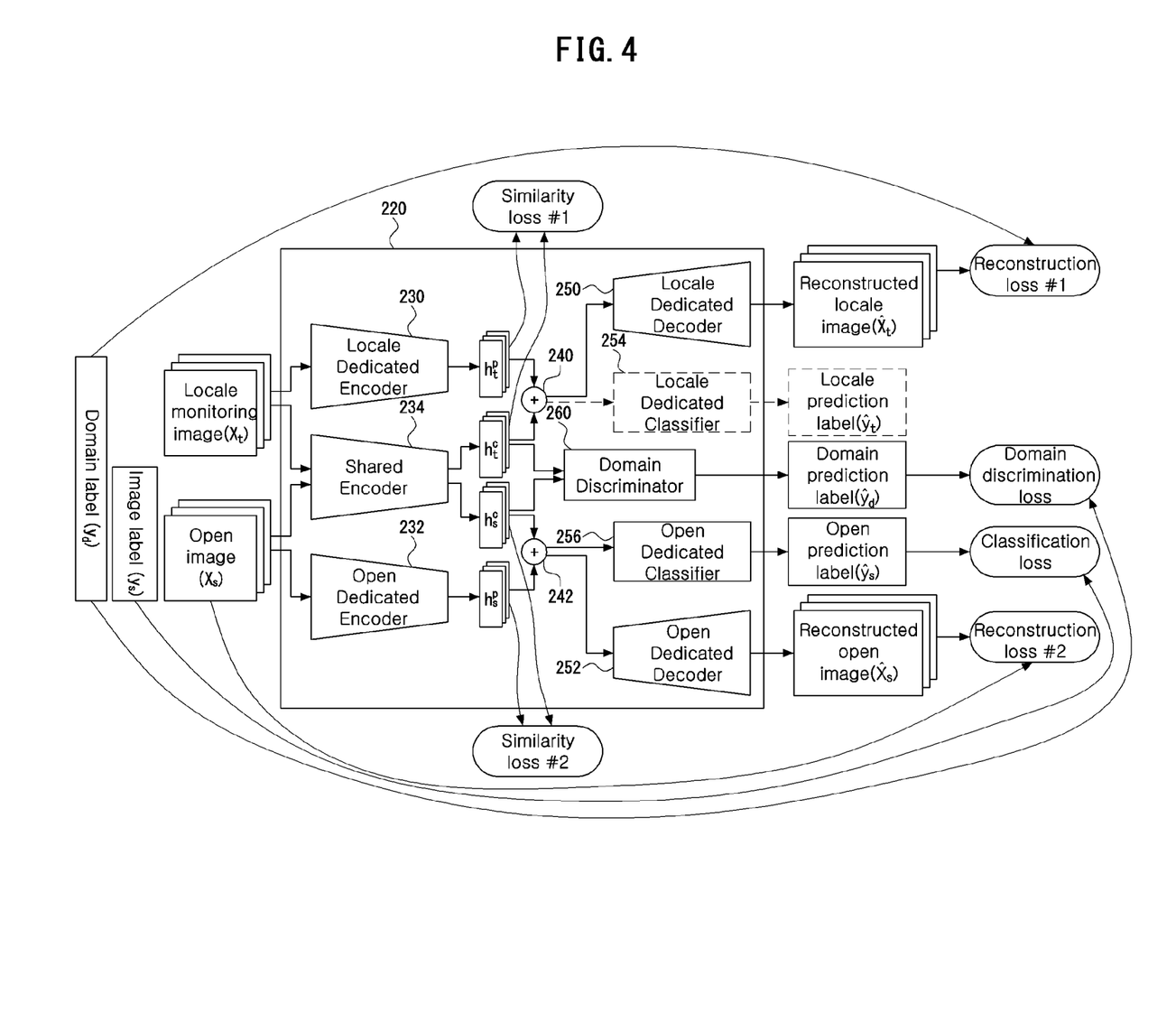
FIG. 4 is a schematic diagram of a model training unit for explaining a method of training the image analysis neural network model.

FIG. 4 is a schematic diagram of a model training unit 280 for explaining a method of training the image analysis neural network model 40 performed by the model training unit 280.

The model training unit 280 may calculate loss functions based on the unlabeled locale monitoring image $X_t$, the labeled open image $X_s$, the open image label $y_s$, the domain label $y_d$, the first feature vector sequence $h_t^p$, the first shared feature vector sequence $h_t^c$, the second shared feature vector sequence $h_s^c$, the second feature vector sequence $h_s^p$, the reconstructed locale monitoring image $\hat{X}_t$, the reconstructed open image $\hat{X}_s$, the open prediction label fs, and the domain prediction label $\hat{y}_d$, for example. The model training unit 280 may update parameters of the image analysis neural network model 40 such that at least one of the loss functions is minimized.

The loss functions may include at least one of: a first similarity loss 300 which is a quantification of a similarity between the first feature vector sequence $h_t^p$ for the locale monitoring image and the first shared feature vector sequence $h_t^c$, a second similarity loss 302 which is a quantification of a similarity between the second feature vector sequence $h_s^p$ for the open image and the second shared feature vector sequence $h_s^c$, a first reconstruction loss 304 which is a quantification of an error between the locale monitoring image $X_t$ and the reconstructed locale image $\hat{X}_t$, a second reconstruction loss 306 which is a quantification of an error between the open image $X_s$ and the reconstructed open image $\hat{X}_s$, a classification loss 308 which is a quantification of an error between the open image label $y_s$ and the open prediction label $\hat{y}_s$, and a domain discrimination loss 310 which is a quantification of a similarity between the domain label $y_d$ and the domain prediction label $\hat{y}_d$.

The first similarity loss 300 may be used to train the locale dedicated encoder 230 and the shared encoder 234 such that the locale dedicated encoder 230 and the shared encoder 234 may output the first feature vector sequence $h_t^p$ and the first shared feature vector sequence $h_t^c$, respectively, different from each other for the input locale monitoring image $X_t$. Here, the first similarity loss may be represented by a normalized value of an inner product of the first feature vector sequence $h_t^p$ and the first shared feature vector sequence $h_t^c$ or a direction cosine between the first feature vector sequence $h_t^p$ and the first shared feature vector sequence $h_t^c$.

The second similarity loss 302 may be used to train the locale dedicated encoder 232 and the shared encoder 234 such that the open dedicated encoder 232 and the shared encoder 234 may output the second feature vector sequence $h_s^p$ and the second shared feature vector sequence $h_s^c$, respectively, different from each other for the input open image $X_s$. Here, the second similarity loss may be represented by a normalized value of an inner product of the second feature vector sequence $h_s^p$ and the second shared feature vector sequence $h_s^c$ or a direction cosine between the second feature vector sequence $h_s^p$ and the second shared feature vector sequence $h_s^c$.

The first reconstruction loss 304 may be used to train the locale dedicated decoder 250, the locale dedicated encoder 230, and the shared encoder 234 such that the locale dedicated decoder 250 may output the reconstructed locale image $\hat{X}_t$ that is as similar as possible to the input locale monitoring image $X_t$. Also, the second reconstruction loss 306 may be used to train the open dedicated decoder 252, the open dedicated encoder 232, and the shared encoder 234 such that the open dedicated decoder 252 may output the reconstructed open image $\hat{X}_s$ that is as similar as possible to the input open image $X_s$.

The classification loss 308 may be used to train the open dedicated encoder 232, the shared encoder 234, and the open dedicated classifier 256 such that the open prediction label $\hat{y}_s$ can be predicted as accurately as possible.

The domain discrimination loss 310 may be used to train the shared encoder 234 and the domain discriminator 260 such that the first shared feature vector sequence $h_t^c$ for the input locale monitoring image $X_t$ and the second shared feature vector sequence $h_s^c$ for the open image $X_s$ cannot be distinguished from each other.

Figure 5:
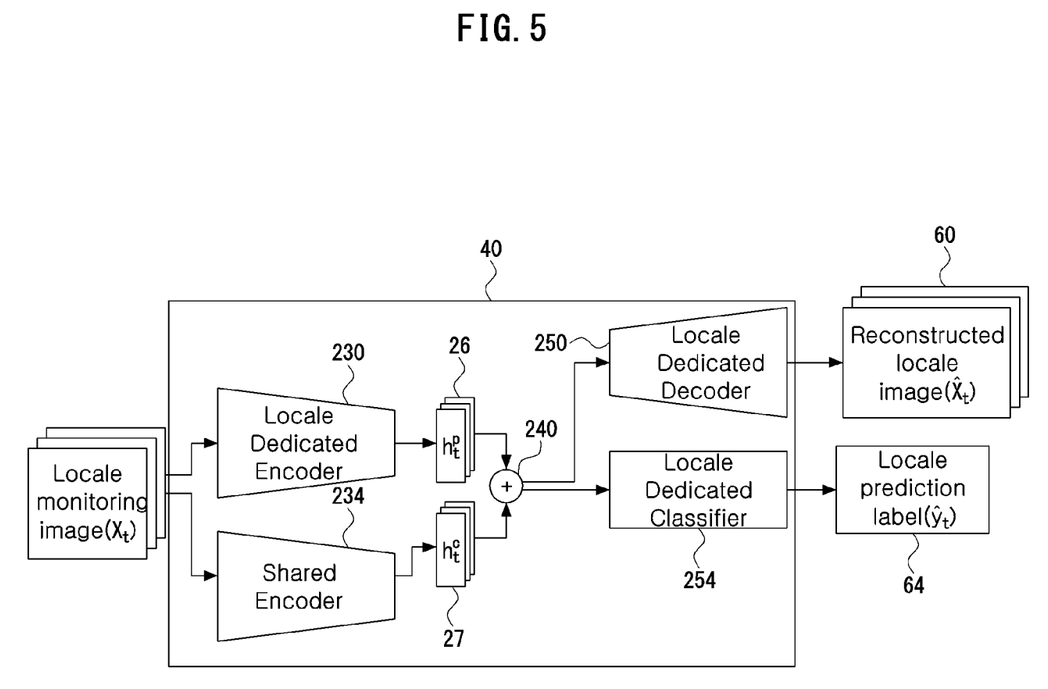
FIG. 5 is a block diagram of an image analysis unit implemented by a trained image analysis neural network model according to an exemplary embodiment of the present disclosure.

FIG. 5 is a block diagram of an image analysis unit 220 implemented by the trained image analysis neural network model according to an exemplary embodiment of the present disclosure. The image analysis unit 220 may be configured to analyze a new input locale monitoring image after an application of the neural network model 40 of which training has been completed.

The image analysis unit 220 may be implemented to include the locale dedicated encoder 230, the shared encoder 234, the locale dedicated decoder 250, and the locale dedicated classifier 254 of the image analysis neural network model 40 of which learning or updating has been completed. The image analysis unit 220 may acquire the new locale monitoring image $X_t$ for the monitoring area to analyze the image. In detail, the image analysis unit 220 may receive the new locale monitoring image $X_t$ for the monitoring area and output the reconstructed image $\hat{X}_t$ for the input locale monitoring image $X_t$ along with the locale prediction label $\hat{y}_t$ which is a reliability score for the image class belonging to the input locale monitoring image $X_t$.

As mentioned above, the update determination unit 290 shown in FIG. 2 may determine whether an image reconstruction error occurred based on the new locale monitoring image $X_t$ processed by the image analysis unit 220 and the reconstructed image $\hat{X}_t$ generated for the new locale monitoring image $X_t$. When it is determined that an image reconstruction error occurred, the update determination unit 290 may request re-training of the image analysis neural network model 40 from the model training unit 280 so that the model training unit 280 update the neural network model 40.

In detail, the update determination unit 290 may calculate a mean squared error between the new locale monitoring image $X_t$ and the reconstructed image $\hat{X}_t$ and compare the mean squared error with a certain prescribed threshold. In case that the mean squared error is greater than the prescribed threshold, the update determination unit 290 may determine that the image reconstruction error occurred and store the new locale monitoring image $X_t$ and the domain label $y_d$ for the new locale monitoring image $X_t$ in the storage 170 so that the new locale monitoring image $X_t$ and the domain label $y_d$ can be used in a re-training of the image analysis neural network model 40.

Also, the update determination unit 290 may further take into account a cumulative number of occurrences of the image reconstruction errors or an increasing rate of the mean squared error in the determination of the occurrence of the image reconstruction error. That is, the update determination unit 290 may determine that the image reconstruction error occurred when the cumulative number of occurrences of the image reconstruction errors or the increasing rate of the mean squared error is greater than a threshold.

When it is determined that the image reconstruction error occurred, the update determination unit 290 may request re-training of the image analysis neural network model 40 from the model training unit 280. Accordingly, the model training unit 280 may re-train the image analysis neural network model 40 by additionally using the new locale monitoring images 20 stored in the storage 170 along with the domain label for the new locale monitoring image, the open image, the label of the open image, and the domain label for the open image.

Figure 6:
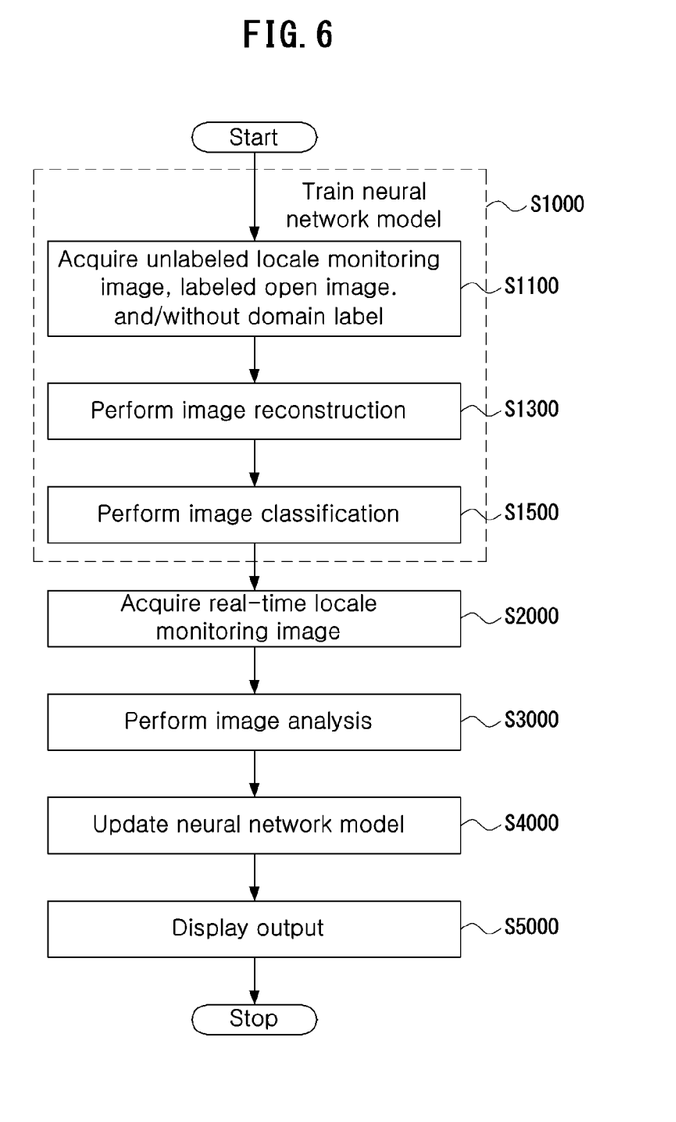
FIG. 6 is a flowchart illustrating an image analysis method in the intelligent image acquisition apparatus according to an exemplary embodiment of the present disclosure.

FIG. 6 is a flowchart illustrating an image analysis method using the intelligent image acquisition apparatus according to an exemplary embodiment of the present disclosure.

First, the model training unit 280 of the intelligent image acquisition apparatus 100 installed in the monitoring area may perform an initial training of the neural network model (S1000). To train the neural network model, the processor 120 may acquire at least one unlabeled locale monitoring image, at least one labeled open image, and the domain label (S1100). In an exemplary embodiment, the processor 120 may acquire the unlabeled locale monitoring image from its image sensor 110 or another intelligent image acquisition apparatus installed in the monitoring area.

Subsequently, the processor 120 may perform the image reconstruction using the acquired data to generate the first and second reconstructed image as described above with reference to FIG. 2 (S1300). Also, the processor 120 may perform the image classification using the acquired data to generate the locale prediction label, the open prediction label, and the domain prediction label as described above with reference to FIG. 2 (S1500). Although the operations of S1300 and S1500 are shown to be performed sequentially in FIG. 6, the operations may be performed simultaneously.

Next, the processor 120 may newly acquire the real-time locale monitoring image (S2000). Then, the image analysis unit 220 of the processor 120 may perform the image analysis for the real-time locale monitoring image by using the trained neural network model (S3000).

Afterwards, the processor 120 may update the neural network model based on a result of the image analysis (S4000). In detail, the processor 120 may calculate an error in the reconstructed locale monitoring image from the reconstructed locale monitoring image 60 and the locale monitoring image 64 to determine whether to perform the re-training of the neural network model. According to a determination result, the processor 120 may perform the re-training of the image analysis neural network model 40 to update the parameters of the model 40 by additionally using the new locale monitoring images 20.

In operation S5000, the processor 120 may provide the output interface device 160 with the result of the image analysis operation S3000 and the newly acquired locale monitoring images, so that a display device connected to the output interface device 160 may display such information.

Finally, the procedure may proceed to the operation S2000 to acquire further locale monitoring images and perform the image analysis of the operation S3000 for the newly acquired locale monitoring images by the updated neural network model. In other words, the processor 120 may repeatedly perform steps S2000 to S5000 by applying the updated neural network model.

Figure 7:
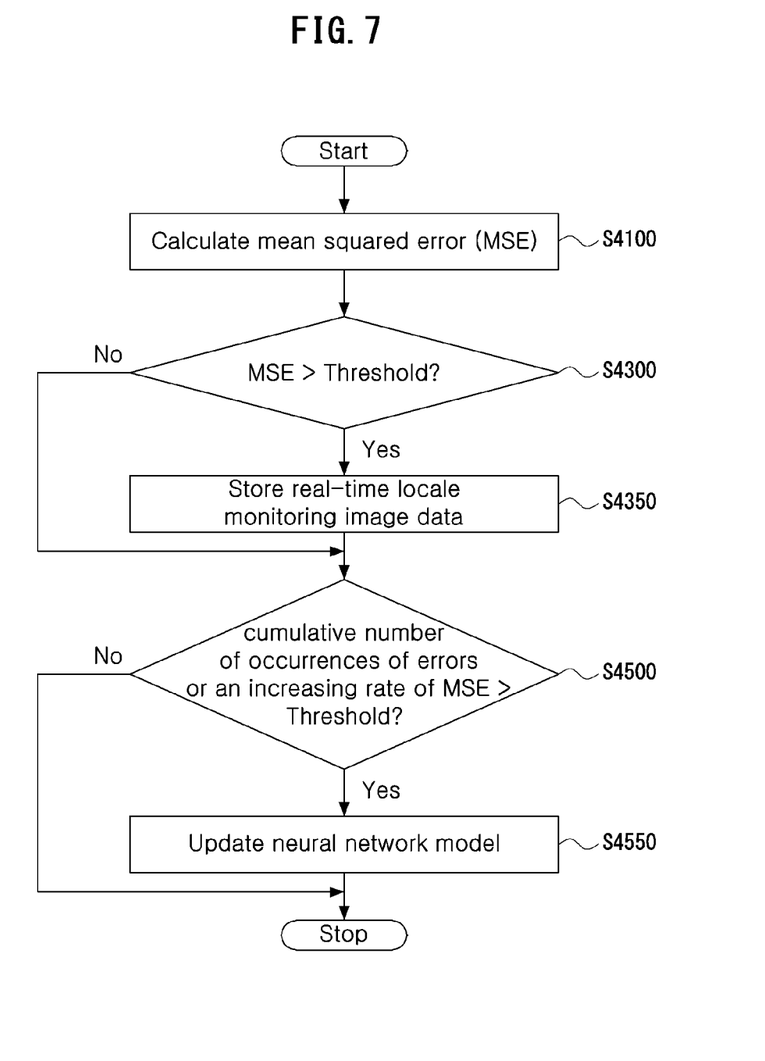
FIG. 7 is a flowchart illustrating, in detail, an operation of updating the image analysis neural network model according to an exemplary embodiment of the present disclosure.

The operation of updating the image analysis neural network model will now be described in more detail with reference to FIG. 7. FIG. 7 is a flowchart illustrating, in detail, the operation of updating the image analysis neural network model according to an exemplary embodiment of the present disclosure.

The processor 120 may determine whether an image reconstruction error occurred based on the new locale monitoring image processed by the image analysis unit 220 and the reconstructed image generated by the image analysis neural network model 40 for the new locale monitoring image.

First, the processor 120 may calculate the mean squared error between the new locale monitoring image and the reconstructed locale image (S4100). Subsequently, the processor 120 may compare the mean squared error with a first threshold (S4300). If the mean squared error is greater than the first threshold in the operation S4300, the processor 120 may store the new locale monitoring image in the storage 170 (S4350).

Afterwards, the processor 120 may compare the cumulative number of occurrences of the image reconstruction errors or the increasing rate of the mean squared error with a second threshold (S4500). If the cumulative number of occurrences of the image reconstruction errors or the increasing rate of the mean squared error is greater than the second threshold, the processor 120 may determine to update the neural network model by re-train the model (S4550). The processor 120 may use the new locale monitoring image stored in the storage 170 while re-training the image analysis neural network model.

The apparatus and method according to exemplary embodiments of the present disclosure can be implemented by computer-readable program codes or instructions stored on a computer-readable intangible recording medium. The computer-readable recording medium includes all types of recording device storing data which can be read by a computer system. The computer-readable recording medium may be distributed over computer systems connected through a network so that the computer-readable program or codes may be stored and executed in a distributed manner.

The computer-readable recording medium may include a hardware device specially configured to store and execute program instructions, such as a ROM, RAM, and flash memory. The program instructions may include not only machine language codes generated by a compiler, but also high-level language codes executable by a computer using an interpreter or the like.

Some aspects of the present disclosure described above in the context of the apparatus may indicate corresponding descriptions of the method according to the present disclosure, and the blocks or devices may correspond to operations of the method or features of the operations. Similarly, some aspects described in the context of the method may be expressed by features of blocks, items, or devices corresponding thereto. Some or all of the operations of the method may be performed by use of a hardware device such as a microprocessor, a programmable computer, or electronic circuits, for example. In some exemplary embodiments, one or more of the most important operations of the method may be performed by such a device.

In some exemplary embodiments, a programmable logic device such as a field-programmable gate array may be used to perform some or all of the functions of the methods described herein. The field-programmable gate array may be operated along with a microprocessor to perform one of the methods described herein. In general, the methods may be performed preferably by a certain hardware device.

While the present disclosure has been described above with respect to exemplary embodiments thereof, it will be apparent to those skilled in the art that various changes and modifications may be made without departing from the spirit and scope of the present disclosure defined in the following claims.

What is claimed is:

1. A method of training a neural network model for use in an analysis of a captured image, comprising:
   providing the neural network model with an unlabeled first image and a labeled second image to obtain a first reconstructed image and a second reconstructed image specific to an image environment;
   providing the neural network model with the unlabeled first image, the labeled second image, an image label of the labeled second image, and a domain label indicating to which category of a first category and a second category an image belongs to obtain a second prediction label for the labeled second image and a domain prediction label for the domain label;
   calculating at least one loss function using the unlabeled first image, the labeled second image, the second prediction label for the labeled second image, and the domain prediction label for the domain label; and
   updating parameters of the neural network model such that the at least one loss function is minimized.

2. The method of training a neural network of claim 1, wherein the first image is a locale monitoring image and the second image is an open image.

3. The method of training a neural network of claim 1, wherein the first image is received from at least one intelligent image capturing device installed in a monitoring area.

4. The method of training a neural network of claim 1, wherein providing the neural network model with the unlabeled first image and the labeled second image to obtain the first reconstructed image and the second reconstructed image comprises:
   generating a first feature vector sequence and a second feature vector sequence from the first image and the second image, respectively; and
   generating the first reconstructed image and the second reconstructed image from the first feature vector sequence and the second feature vector sequence, respectively.

5. The method of training a neural network of claim 4, wherein generating the first feature vector sequence and the second feature vector sequence from the first image and the second image comprises:
   generating, by a first encoder, the first feature vector sequence from the first image;
   generating, by a second encoder, the second feature vector sequence from the second image; and
   generating, by a shared encoder, into a first shared feature vector sequence and a second shared feature vector sequence from the first image and the second image, respectively.

6. The method of training a neural network of claim 5, wherein generating the first reconstructed image and the second reconstructed image from the first feature vector sequence and the second feature vector sequence comprises:
   obtaining, by a first decoder, the first reconstructed image by decoding a first image feature vector sequence which is a combination of the first feature vector sequence and the first shared feature vector sequence; and
   obtaining, by a second decoder, the second reconstructed image by decoding a second image feature vector sequence which is a combination of the second feature vector sequence and the second shared feature vector sequence.

7. The method of training a neural network of claim 5, wherein providing the neural network model with the unlabeled first image, the labeled second image, the image label of the labeled second image, and the domain label to obtain the second prediction label for the labeled second image and the domain prediction label for the domain label comprises:
   estimating a reliability of a first classification category to which the first image belongs by using the first image feature vector sequence;
   estimating a reliability of a second classification category to which the second image data belongs by using the second image feature vector sequence; and
   obtaining a domain prediction label indicating a prediction of whether an input image belongs to the first classification category or the second classification category by using the first shared feature vector sequence and the second shared feature vector sequence.

8. The method of training a neural network of claim 7, wherein the first image feature vector sequence is generated by combining the first feature vector sequence and the first shared feature vector sequence,
   wherein the second image feature vector sequence is generated by combining the second feature vector sequence and the second shared feature vector sequence.

9. The method of training a neural network of claim 6, wherein calculating the at least one loss function comprises:
   calculating a first similarity loss by using a similarity between the first feature vector sequence and the first shared feature vector sequence;
   calculating a second similarity loss by using a similarity between the second feature vector sequence and the second shared feature vector sequence;
   calculating a first reconstruction loss by using an error between the first image and the first reconstructed image;
   calculating a second reconstruction loss by using an error between the second image and the second reconstructed image;
   calculating a classification loss by using an error between a label of the second image and a second prediction label;
   calculating a discrimination loss by using an error between the domain label and the domain prediction label; and
   calculating the loss function by using at least one of the first similarity loss, the second similarity loss, the first reconstruction loss, the second reconstruction loss, the classification loss, and the discrimination loss.

10. A device for training a neural network model for use in an analysis of a captured image, comprising:
    a processor; and
    a memory storing at least one instruction to be executed by the processor,
    wherein the at least one instruction when executed by the processor causes the processor to:
    provide the neural network model with an unlabeled first image and a labeled second image to obtain a first reconstructed image and a second reconstructed image specific to an image environment;
    provide the neural network model with the unlabeled first image, the labeled second image, an image label of the labeled second image, and a domain label indicating to which category of a first category and a second category an image belongs to obtain a second prediction label for the labeled second image and a domain prediction label for the domain label;
    calculate at least one loss function using the unlabeled first image, the labeled second image, the second prediction label for the labeled second image, and the domain prediction label for the domain label; and update parameters of the neural network model such that the at least one loss function is minimized.

11. The device for training a neural network model of claim 10, wherein the first image is a locale monitoring image and the second image is an open image.

12. The device for training a neural network model of claim 10, wherein the first image is received from at least one intelligent image capturing device installed in a monitoring area.

13. The device for training a neural network model of claim 10, wherein the instruction causing the processor to provide the neural network model with the unlabeled first image and the labeled second image to obtain the first reconstructed image and the second reconstructed image comprises an instruction causing the processor to:

generate a first feature vector sequence and a second feature vector sequence from the first image and the second image, respectively; and generate the first reconstructed image and the second reconstructed image from the first feature vector sequence and the second feature vector sequence, respectively.

14. The device for training a neural network model of claim 13, wherein the instruction causing the processor to generate the first feature vector sequence and the second feature vector sequence from the first image and the second image comprises an instruction causing the processor to:

generate, by a first encoder, the first feature vector sequence from the first image;

generate, by a second encoder, the second feature vector sequence from the second image; and generate, by a shared encoder, into a first shared feature vector sequence and a second shared feature vector sequence from the first image and the second image, respectively.

15. The device for training a neural network model of claim 14, wherein the instruction causing the processor to generate the first reconstructed image and the second reconstructed image from the first feature vector sequence and the second feature vector sequence comprises an instruction causing the processor to:

obtain, by a first decoder, the first reconstructed image by decoding a first image feature vector sequence which is a combination of the first feature vector sequence and the first shared feature vector sequence; and obtain, by a second decoder, the second reconstructed image by decoding a second image feature vector sequence which is a combination of the second feature vector sequence and the second shared feature vector sequence.

16. The device for training a neural network model of claim 14, wherein the instruction causing the processor to provide the neural network model with the unlabeled first image, the labeled second image, the image label of the labeled second image, and the domain label to obtain the second prediction label for the labeled second image and the domain prediction label for the domain label comprises an instruction causing the processor to:

estimate a reliability of a first classification category to which the first image belongs by using the first image feature vector sequence;

estimate a reliability of a second classification category to which the second image data belongs by using the second image feature vector sequence; and obtain a domain prediction label indicating a prediction of whether an input image belongs to the first classification category or the second classification category by using the first shared feature vector sequence and the second shared feature vector sequence.

17. The device for training a neural network model of claim 16, wherein the first image feature vector sequence is generated by combining the first feature vector sequence and the first shared feature vector sequence, wherein the second image feature vector sequence is generated by combining the second feature vector sequence and the second shared feature vector sequence.

18. The device for training a neural network model of claim 15, wherein the instruction causing the processor to calculate the at least one loss function comprises an instruction causing the processor to:

calculate a first similarity loss by using a similarity between the first feature vector sequence and the first shared feature vector sequence;

calculate a second similarity loss by using a similarity between the second feature vector sequence and the second shared feature vector sequence;

calculate a first reconstruction loss by using an error between the first image and the first reconstructed image;

calculate a second reconstruction loss by using an error between the second image and the second reconstructed image;

calculate a classification loss by using an error between a label of the second image and a second prediction label;

calculate a discrimination loss by using an error between the domain label and the domain prediction label; and calculate the loss function by using at least one of the first similarity loss, the second similarity loss, the first reconstruction loss, the second reconstruction loss, the classification loss, and the discrimination loss.

19. An intelligent image acquisition apparatus, comprising:

a processor; and a memory storing at least one instruction to be executed by the processor, wherein the at least one instruction when executed by the processor causes the processor to:

train the neural network model based on an unlabeled first image and a labeled second image;

perform an image analysis on a newly acquired third image by applying the neural network model; and update the neural network model according to an image analysis result, wherein the instruction when executed by the processor causing the processor to train the neural network model comprises an instruction when executed by the processor causes the processor to:

provide the neural network model with the unlabeled first image and the labeled second image to obtain a first reconstructed image and a second reconstructed image specific to an image environment;

provide the neural network model with the unlabeled first image, the labeled second image, an image label of the labeled second image, and a domain label indicating to which category of a first category and a second category an image belongs to obtain a second prediction label for the labeled second image and a domain prediction label for the domain label;

calculate at least one loss function using the unlabeled first image, the labeled second image, the second prediction label for the labeled second image, and the domain prediction label for the domain label; and update parameters of the neural network model such that the at least one loss function is minimized.

20. The intelligent image acquisition apparatus of claim 19, wherein the instruction causing the processor to update the neural network model comprises an instruction causing the processor to:

calculate a mean squared error between the third image and a reconstruction image of the third image;

when the mean squared error is greater than a first threshold, store the third image in a storage device;

calculate a cumulative number of occurrences of image reconstruction errors based on a difference between the third image and the reconstruction image of the third image;

when at least one of the cumulative number of occurrences of image reconstruction errors and an increasing rate of the mean squared error is greater than a second threshold, update the neural network model.

* * * * *